United States Patent
Woodle et al.

(10) Patent No.: US 12,257,575 B2
(45) Date of Patent: Mar. 25, 2025

(54) PROCESSES FOR CHANGING CATALYTIC ACTIVITY IN A RADIAL FLOW REFORMING REACTOR, AND A RADIAL FLOW REFORMING REACTOR WITH A MODIFIED CATALYTIC ACTIVITY

(71) Applicant: UOP LLC, Des Plaines, IL (US)

(72) Inventors: Guy B. Woodle, Mount Prospect, IL (US); Fariha Avais, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 1050 days.

(21) Appl. No.: 17/198,655

(22) Filed: Mar. 11, 2021

(65) Prior Publication Data

US 2021/0308646 A1 Oct. 7, 2021

Related U.S. Application Data

(60) Provisional application No. 63/006,374, filed on Apr. 7, 2020.

(51) Int. Cl.
*B01J 8/04* (2006.01)
*B01D 53/02* (2006.01)
(Continued)

(52) U.S. Cl.
CPC ............ *B01J 8/0465* (2013.01); *B01D 53/02* (2013.01); *B01J 8/008* (2013.01); *B01J 8/0411* (2013.01);
(Continued)

(58) Field of Classification Search
CPC ........ B01J 8/0465; B01J 8/008; B01J 8/0411; B01J 2208/00805; B01J 2208/025;
(Continued)

(56) References Cited

U.S. PATENT DOCUMENTS 3,249,405 A 5/1966 Waddill
6,222,086 B1 * 4/2001 Sharma ................. B01J 29/005
585/482

(Continued)

FOREIGN PATENT DOCUMENTS

FR 3033264 A1 9/2016
WO 0002655 1/2000
WO WO-0002655 A1 * 1/2000 ............ B01J 8/0214

OTHER PUBLICATIONS

International Search Report from corresponding PCT application No. PCT/US2021/024036 mailed Jul. 8, 2021.
(Continued)

*Primary Examiner* — Randy Boyer
*Assistant Examiner* — Juan C Valencia (57) ABSTRACT

A fixed bed, radial flow reforming reactor having an inner catalyst zone between an inlet fluid zone and an outlet fluid zone. The catalyst zone is separated into two concentric, annular zones, a first annular zone having a first solid particle material having a first catalytic activity for reforming hydrocarbons into the catalyst zone, and, a second annular zone having a second solid particle material having a second catalytic activity for reforming hydrocarbons into the catalyst zone, wherein the second catalytic activity is different. One of the materials may be inert. A divider may be used to separate the two annular zones.

11 Claims, 4 Drawing Sheets

(51) Int. Cl.
  *B01J 8/00* (2006.01)
  *C10G 59/02* (2006.01)
(52) U.S. Cl.
  CPC ........ *C10G 59/02* (2013.01); *B01D 2255/102* (2013.01); *B01J 2208/00805* (2013.01); *B01J 2208/025* (2013.01)
(58) Field of Classification Search
  CPC ............. B01J 2208/0084; B01D 53/02; B01D 2255/102; C10G 59/02
  See application file for complete search history.

(56) References Cited

U.S. PATENT DOCUMENTS

| | | | |
|---|---|---|---|
| 8,747,768 | B2 | 6/2014 | Glover et al. |
| 10,478,794 | B1* | 11/2019 | McGahee .............. B01J 29/068 |
| 2002/0000066 | A1 | 1/2002 | Bentley et al. |
| 2007/0060782 | A1* | 3/2007 | Ablin ...................... B01J 8/003 |
| | | | 422/219 |
| 2009/0324463 | A1 | 12/2009 | Bozzano et al. |
| 2013/0340229 | A1 | 12/2013 | Vetter et al. |
| 2018/0229198 | A1 | 8/2018 | Behkish et al. |
| 2020/0023330 | A1 | 1/2020 | Rizzi |

OTHER PUBLICATIONS

Written Opinion from corresponding PCT application No. PCT/US2021/024036 mailed Jul. 8, 2021.
Extended European Search Report from corresponding European application No. EP 21784550.2 dated Jan. 15, 2024.

* cited by examiner

PROCESSES FOR CHANGING CATALYTIC ACTIVITY IN A RADIAL FLOW REFORMING REACTOR, AND A RADIAL FLOW REFORMING REACTOR WITH A MODIFIED CATALYTIC ACTIVITY

RELATED APPLICATIONS

This application claims priority to U.S. Provisional Patent Application No. 63/006,374 filed on Apr. 7, 2020, the entirety of which is incorporated herein by reference.

FIELD OF THE INVENTION

The present invention relates generally to an apparatus and a process for catalytic reforming of hydrocarbons and more particularly to processes for modifying, e.g., reducing, or otherwise controlling the catalytic activity of the reactor, processes for loading catalyst reactor, and a reactor with a modified catalytic activity.

BACKGROUND OF THE INVENTION

The reforming of petroleum raw materials is an important process for producing useful products. For example, reforming processes may be utilized for separating and upgrading hydrocarbons to provide a transportation fuel, such as producing a naphtha feed stream and upgrading the octane value of the naphtha from the production of gasoline. Additionally, hydrocarbons in feed streams from a raw petroleum source may also be utilized the production of desired chemical precursors for use in the production of plastics, detergents and other products. Accordingly, reforming may be used to produce the desired chemical precursors.

The catalytic reforming process is well known in the art. The principal reactions that take place are the dehydrogenation of naphthenes to aromatics, dehydrocyclization of paraffins, isomerization of paraffins and naphthenes, hydrocracking of paraffins to light hydrocarbons, and formation of coke which is deposited on the catalyst. The formation of coke on the catalyst causes the catalyst to gradually lose activity over time. Accordingly, the catalyst requires regeneration and/or replacement.

One type of reactor that is typically used for catalytic reforming process is a radial flow reactor. The radial flow reactors provide for contact between a fluid, typically gas, and a solid. The solid usually comprises a catalytic material on which the fluid reacts to form a product. The fluid is provided at an inlet zone, flows through an annular catalytic zone, and is recovered via an outlet zone. Some radial flow reactors have a central inlet zone, while some have a central outlet zone. Within the annular catalytic zone catalyst can be continually supplied and withdrawn, or the catalyst can be provided in fixed beds. The present invention is directed at the radial reactors for reforming processes with fixed beds.

Often, it is beneficial to provide an annular catalytic zone with modified catalytic activity in fixed bed radial reactors. One way in which catalytic activity of fixed bed radial reactors can be modified is by "short loading" catalyst into the reactors. Current approaches to short-loading these reactors involves maintaining the catalyst bed length (radial) constant and decrease the bed height (axial) to achieve the desired loaded catalyst quantity. However, decreasing the catalyst bed height requires modification of the upper section of the reactor to ensure proper process flow through the catalyst bed. The modification of the upper reactor section may include, but is not limited to, extension of baffles, addition of flow re-distribution devices, adding inert material to the top of the catalyst bed, etc.

These modifications add cost, may increase turnaround time for reload, add complexity to the system and installation of reactor internals, and increase maintenance requirements.

Therefore, there remains a need for effective and efficient ways to modify the catalytic activity in a radial flow reforming reactor.

SUMMARY OF THE INVENTION

The present invention addresses one or more of the drawbacks and provides effective and efficient ways to modify the catalytic activity in a radial flow reforming reactor. In some cases, that may be reducing the catalytic activity. Accord to the various embodiments, the available reactor volume in the catalyst zone is separated into an active region (to be filled with active catalyst) and an substantially less active region (to be filled with a suitable inert material or material with a lower catalytic activity than the material in the active region). The active region may be situated on (i) on the inlet portion or annulus of the reactor adjacent the centerpipe, (ii) on the outlet portion or annulus of the reactor adjacent the outer screen, basket, scallops, etc., or (iii) on both the inlet and outlet portions of the reactor. A mechanical device may be utilized to separate the available reactor volume in the catalyst zone. The mechanical device may be used during loading activity and may or may not remain in the reactor for subsequent operation.

Therefore, the present invention may be characterized, in at least one aspect, as providing a process for changing overall catalytic activity in a fixed bed, radial flow reforming reactor by: forming a first annular zone in the radial flow reforming reactor, the first annular zone comprising a first solid particle material having a first catalytic activity for reforming hydrocarbons; and, forming a second annular zone in the radial flow reforming reactor, the second annular zone comprising a second solid particle material having a second catalytic activity for reforming hydrocarbons, the second catalytic activity different than the first catalytic activity. The first and second annular zones define a flow path for a stream of hydrocarbons. The flow path passes from the first annular zone to the second annular zone. The first solid particle material may be an inert material. The second solid particle material may be an inert material. The first annular zone may be an inner annular zone. The second annular zone may be an inner annular zone. The process may further include providing a divider between the first and second annular zones. The process may also further include removing the divider before operating the fixed bed, radial flow reforming reactor. The divider may be positioned between the first and second annular zones while operating the fixed bed, radial flow reforming reactor.

In addition, in some aspects, the present invention may be characterized, generally, as providing a process for loading catalyst into a fixed bed, radial flow reforming reactor, the fixed bed, radial flow reforming reactor comprising an inlet fluid zone, an outlet fluid zone, and an inner catalyst zone between the inlet fluid zone and the outlet fluid zone, by: loading a first solid particle material having a first catalytic activity for reforming hydrocarbons into the inner catalyst zone, the first solid particle material forming a first annular zone when loaded; and, loading a second solid particle material having a second catalytic activity for reforming hydrocarbons into the inner catalyst zone, the second solid particle material forming a second annular zone when loaded, the second catalytic activity different than the first catalytic activity. The first and second annular zones may define a flow path for a stream of hydrocarbons through the inner catalyst zone. The flow path may pass from the first annular zone to the second annular zone. The first solid particle material may be an inert material. The second solid particle material may be an inert material. The process may further include providing a divider in the inner catalyst zone so as to provide first and second annular spaces for the first and second solid particle materials, respectively. The process may also further include removing the divider before operating the fixed bed, radial flow reforming reactor. The divider may be positioned between the first and second annular zones while operating the fixed bed, radial flow reforming reactor. The divider may be provided in the inner catalyst zone before loading both the first and second solid particle materials.

Further, in at least one aspect, the present invention may be broadly characterized as providing a fixed bed, radial flow reforming reactor having: an inlet fluid zone; an outlet fluid zone; and, and a catalyst zone between the inlet fluid zone and the outlet fluid zone. The catalyst zone may be separated into two concentric, annular zones. A first annular zone has a first solid particle material having a first catalytic activity for reforming hydrocarbons into the catalyst zone and the first solid particle material forms a first annular zone when loaded. A second annular zone has a second solid particle material having a second catalytic activity for reforming hydrocarbons into the catalyst zone and the second catalytic activity is different than the first catalytic activity. The first and second annular zones define a flow path for a stream of hydrocarbons through the catalyst zone and the flow path passes from the first annular zone to the second annular zone. The fixed bed, radial flow reforming reactor may further include a divider in the catalyst zone separating the first and second annular zones. The first material may be inert. The second solid particle material may be an inert material. The first annular zone may be an outer annular zone.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION OF THE INVENTION

As mentioned above, the present invention provides for effective and efficient way of controlling or modifying the catalytic activity in a radial flow reforming reactor. As noted above, according to the various embodiments, the catalyst zone in the reactor is separated into two annular sections. One of the annular sections contains a first material having a first catalyst activity. The other annular section contains a second material that has a different catalyst activity, and in some cases can be an inert material. In various embodiments, a divider is used to separate the two materials and keeping them from mixing. The material of the divider will be such that it will not have a negative effect on unit performance or hydrocarbon flow through the catalyst bed. By using a divider and loading procedure an existing semi-regen radial reactor can be short-loaded to result in decreased loaded catalyst quantity without modification of reactor internals.

With these general principles in mind, one or more embodiments of the present invention will be described with the understanding that the following description is not intended to be limiting.

Figure 1:
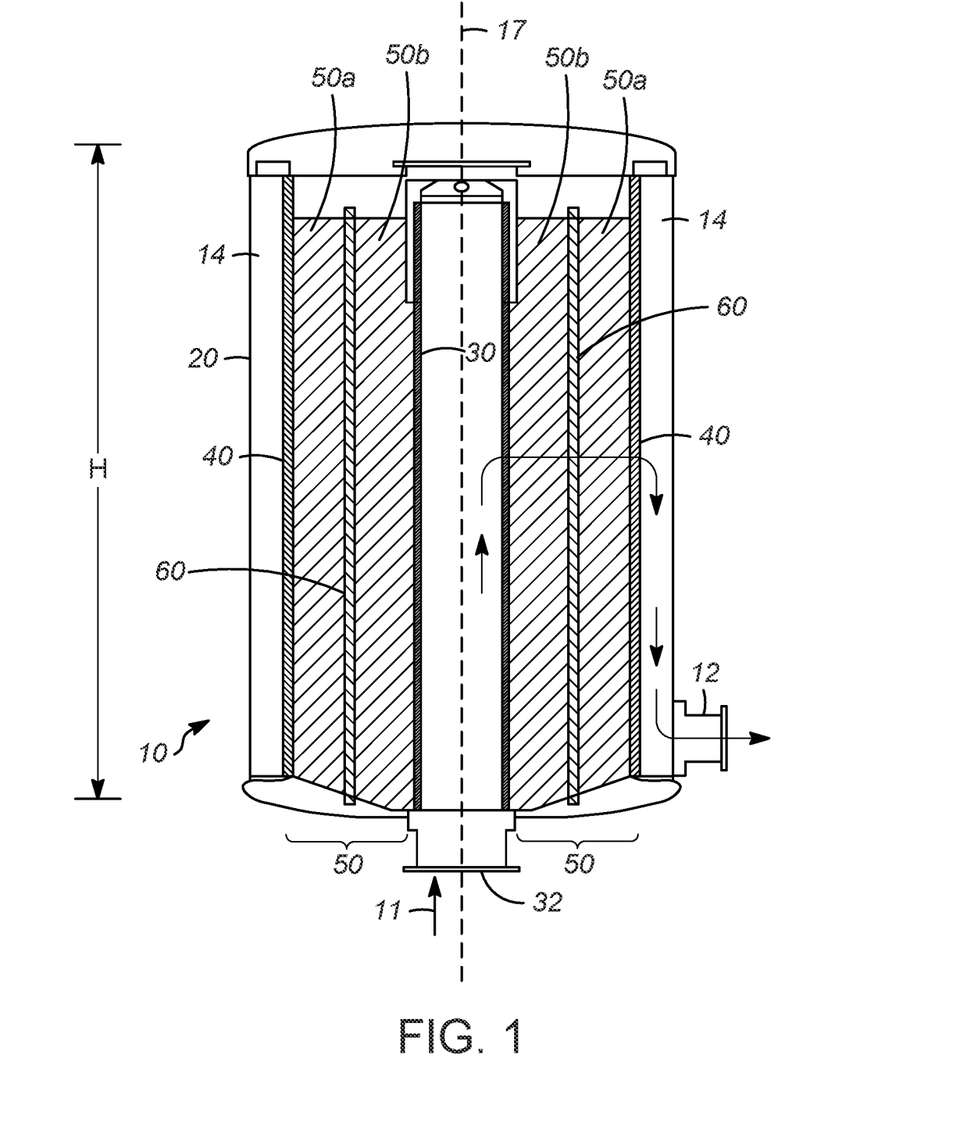
FIG. 1 illustrates a reactor configuration in accordance with various aspects of the present invention.
Figure 2:
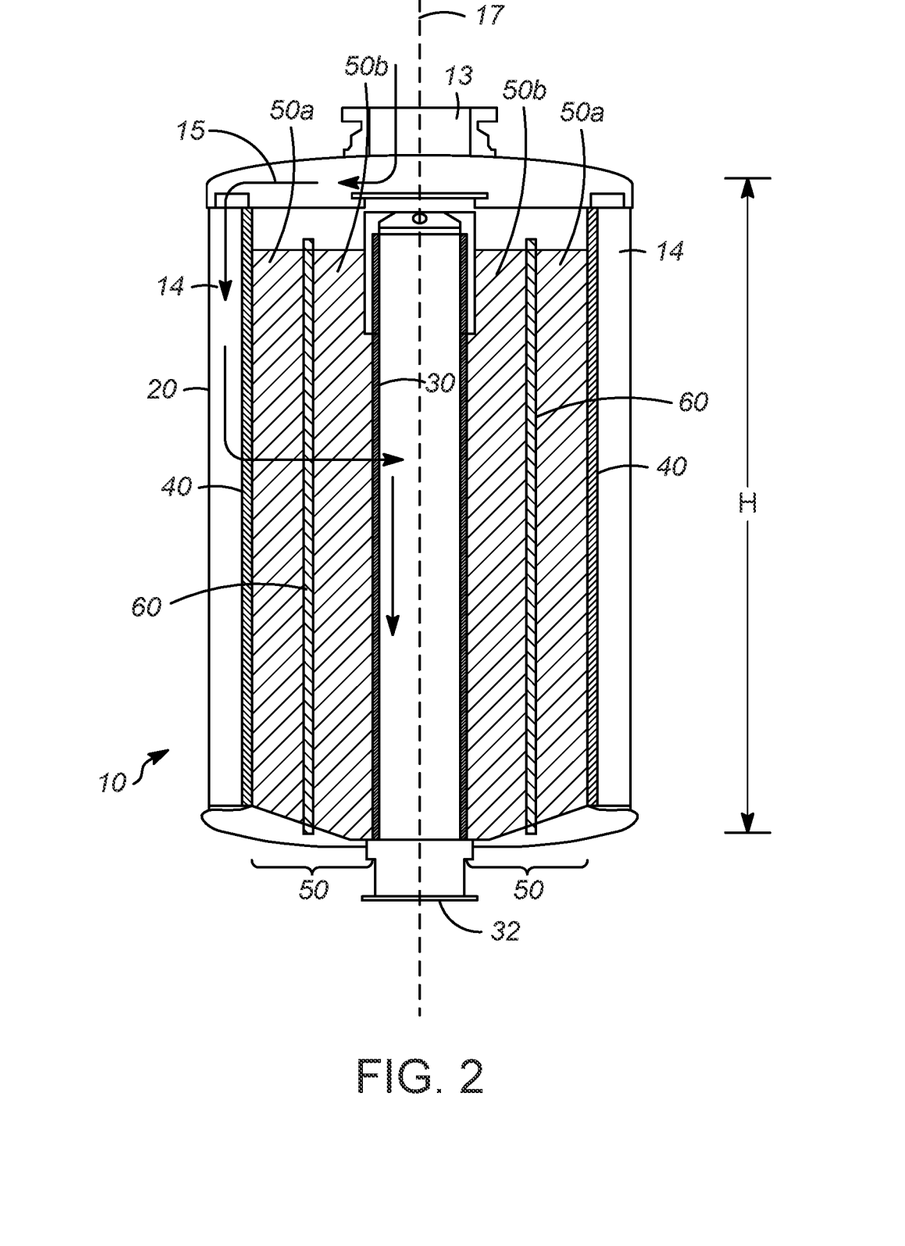
FIG. 2 illustrates a reactor configuration in accordance with various other aspects of the present invention.

As shown in FIGS. 1 and 2, a radial flow reactor 10 for a reforming process in accordance with various aspects is illustrated. The reactor 10 includes a reactor shell 20, one partition in the form of a centerpipe 30, an outer partition in the form of screened partition 40, and a catalyst zone 50.

In the reactor 10 of FIG. 1, fluid enters the reactor 10 through an inlet 32 at the bottom of the reactor and travels upwardly through the centerpipe 30 in the direction indicated by arrow 11. In this embodiment, the centerpipe 30 functions as an inlet fluid zone. As the fluid flows upwardly, portions of the fluid are directed radially through the centerpipe 30, into the catalyst zone 50 where the fluid contacts catalyst and reacts to form a product stream. The product stream flows radially outwardly through the outer screened partition 40 and into an annular space 14 between the screened partition 40 and the reactor shell 20. The product stream is collected in the annular space 14, which functions as an outlet fluid zone, and passes out of the reactor 10 from an outlet 12.

Turning to FIG. 2, the reactor 10 may be configured to have an opposite flow pattern such that fluid enters through a fluid inlet 13 and enters the annular space 14 between the reactor shell 20 and the outer screened partition 40. In this embodiment, the annular space 14 functions as the inlet fluid zone. From the annular space 14, the feed flows radially inwardly through the catalyst zone 50 where it contacts catalyst and reacts to form a product stream. The product stream flows radially inwardly through the centerpipe 30 where it collects in the centerpipe and exits the reactor 10 through the outlet 32. Thus, the centeripe 30 functions as the outlet fluid zone in the embodiment of FIG. 2.

Other configurations of the reactor 10 and flow are also possible and contemplated herein.

As noted at the outset, currently, when it is desired to adjust the catalytic activity, the height H of the catalyst zone is reduced. However, in the present invention, instead of reducing the height of the catalyst zone, the present invention separates the catalyst zone 50, as shown in FIGS. 1 and 2, into two annular zones 50a, 50b which contain material having different levels of catalytic activity for reforming hydrocarbons. For example, the material in the inner annular zone 50b may contain material that has a higher catalytic activity for reforming hydrocarbons than the material in the outer annular zone 50a. Alternatively, the material in the outer annular zone 50a may have a higher catalytic activity for reforming hydrocarbons than the material in the inner annular zone 50b.

As used herein, the "catalytic activity for reforming hydrocarbons" of the material in the annular zones 50a, 50b of the catalyst zone 50 refers to the overall average activity when the materials are located in. One method to determine the catalytic activity would be through a yield estimating model, such as in the Examples 1 and 2, below.

Typically, one of the annular zones 50a, 50b of the catalyst zone 50 will include conventional reforming catalyst. Such catalysts are known in the art.

In some embodiments, the material with the lower catalytic activity for reforming hydrocarbons is an inert material. For example, silicon oxide/aluminum oxide composite ceramic spheres (or other shapes including extrudates and pellets) may be used. Aluminum oxide, commonly called alumina, may also be used as the lower catalytic activity material. In some embodiment the material with the lower catalytic activity for reforming hydrocarbons comprises a less active reforming catalyst. For example, reforming catalysts containing alkali metals often exhibit lower catalytic activity and, therefore, these materials could be used as the lower catalytic activity material in this application. Reforming catalysts containing lithium, sodium, potassium, and cesium may also be used. Furthermore, reforming catalysts containing rare-earth elements or elements in the lanthanide series may be used.

The two annular zones 50a, 50b of the catalyst zone 50 are preferably is concentric to ensure proposer flow of the fluid.

In a preferred embodiment, a divider 60 is located between the annular zones 50a, 50b of the catalyst zone 50. The divider 60 may be porous to allow for fluids to flow there through. Example materials include a screen, wire mesh, mesh netting or other porous members. The divider 60 is preferably inert and has essentially no impact on fluid hydraulics through the catalyst zone 50 while providing a way of separating or containing the two materials (catalyst and inert/lower activity material) in their respective zones 50a, 50b. However, as discussed below, it is contemplated that the divider 60 is removed after loading. Accordingly, it such cases, the divider 60 need not be porous. Rather, the divider 60 may be formed from any material, including non-porous materials that enables the loading of the two materials into their respectively zones 50a, 50b.

When the two catalyst materials are loaded into the annular zones 50a, 50b of the catalyst zone 50, the divider 60 maintains the materials in the appropriate annular zone 50a, 50b. In some embodiments, the divider 60 may be removed once loaded. Alternatively, the divider 60 may remain in place during operation.

If a divider 60 is not present, the two materials can be loaded simultaneously along the height H of the reactor in the two zones 50a, 50b from the top to the bottom of the reactor 10 so that the catalyst zone 50 is divided into the two annular zones 50a, 50b as the materials are loaded. For example, two loading mechanisms (e.g., loading socks), one with each of the materials, could be used to fill the two zones 50a, 50b simultaneously.

Figure 3:
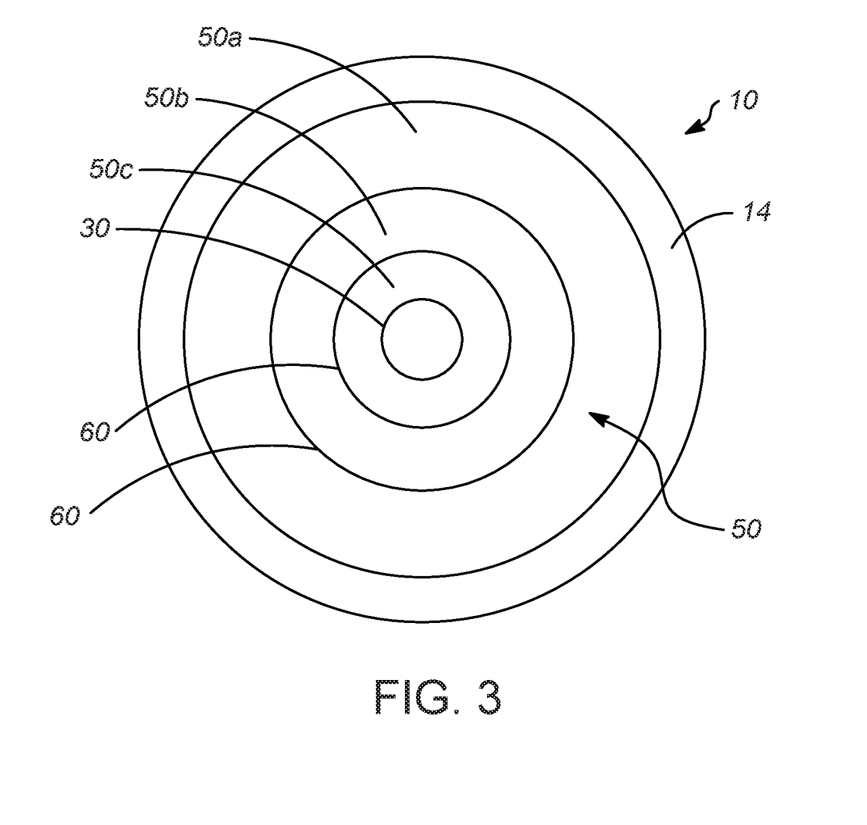
FIG. 3 illustrates a top view of a reactor configuration in accordance with various other aspects of the present invention; and, FIG. 4 shows a graph of catalyst performance comparing a reactor loaded according to the present invention and a fully loaded reactor.

Although FIGS. 1 and 2 depict two annular zones 50a, 50b, FIG. 3 shows a top view of a reactor 10 in which the catalyst zone 50 is separated into three annular zones 50a, 50b, 50c. In such a case, the material in two of the three annular zones 50a, 50b, 50c of the catalyst zone 50 may be the same. For example, the outermost zone 50a, and the innermost zone 50c may contain inert material, and the middle annular zone 50b of the catalyst zone 50 may contain the material with higher catalytic activity for reforming hydrocarbons. Other arrangements are contemplated.

Example 1

This example presents comparative results of kinetic model-based simulations when considering a naphtha feedstock comprising principally C6-C8 hydrocarbons. The naphtha feedstock had the following characteristics:
Distillation of naphtha feed,° C. (° F.)
IBP 80.5 (177)
50% 105.6 (222)
EBP 147.2 (297)
API 62.1
Composition (vol %)
Paraffins 66.7
Naphthenes 21.5
Aromatics 11.8

Reforming kinetic model simulations were performed based on the known use of a Catalyst A, a commercially produced semi-regenerable catalyst, to process the C6-C8 feedstock described above. Operating pressure was about 2,200 kPa (320) psig and molecular hydrogen supplied at a molar ratio to the feedstock of about 4.5. Temperature was varied to obtain conversion of nonaromatic hydrocarbons necessary to achieve a resultant product with C5+ RONC of 95. Liquid hourly space velocity was varied to represent cases of fully catalyst loaded, or filled, reactors compared to partially catalyst loaded, or filled, reactors. Results are evaluated on the basis of the yields of C5+ hydrocarbons and Total Aromatics and shown in the below TABLE 1.

TABLE 1

|  | Fully loaded | Partially loaded |
| --- | --- | --- |
| LHSV (1/hr) | 0.94 | 1.17 |
| C5+ Yield* (wt-%) | 80.48 | 80.93 |
| H2 Yield* (SCFB) | 738 | 768 |
| Total Aromatics* (wt-%) | 47.02 | 47.53 |
| Required SOR WAIT ° C. (° F.) | 495 (923) | 497.78 (928) |

In this example, the partially loaded case uses approximately 80% to the catalyst quantity compared to the fully loaded case. The effect of this is increased C5+ yield of 0.45 wt-%, increased total aromatics yield of 0.51 wt-%, increased hydrogen yield of 30 SCFB. This result is achieved with the partially loaded case having somewhat lower catalytic activity by utilizing an operating temperature 2.78° C. (5° F.) greater than the fully loaded case.

The increased yields for the partially loaded case translate to significantly improved operating economics.

Example 2

This example presents comparative results of kinetic model-based simulations when considering a naphtha feedstock comprising principally C6-C8 hydrocarbons. The naphtha feedstock had the following characteristics:
Distillation of naphtha feed, ASTM D-86° C. (° F.)
IBP 90.6 (195)
10% 118.9 (246)

30% 132.3 (270)
50% 145.6 (294)
70% 161.1 (322)
90% 179.4 (355)
FEP 203.3 (398)
API 50.4
Composition (vol %)
Paraffins 34.0
Naphthenes 45.9
Aromatics 20.1

Reforming kinetic model simulations were performed based on the known use of a Catalyst B, a commercially produced semi-regenerable catalyst, to process the C6-C8 feedstock described above. Operating pressure was about 2,275 kPa (330 psig) and molecular hydrogen supplied at a molar ratio to the feedstock of about 3.6. Temperature was varied to obtain conversion of nonaromatic hydrocarbons necessary to achieve a resultant product with C5+ RONC of 93. Liquid hourly space velocity was varied to represent cases of fully catalyst loaded, or filled, reactors compared to partially catalyst loaded, or filled, reactors. Results are evaluated on the basis of the yields of C5+ hydrocarbons and Total Aromatics and are shown in the below TABLE 2.

TABLE 2

| | Fully loaded | Partially loaded |
|---|---|---|
| LHSV (1/hr) | 1.82 | 2.02 |
| C5+ Yield* (wt-%) | 94.39 | 94.63 |
| H2 Yield* (SCFB) | 920 | 938 |
| Total Aromatics* (wt-%) | 60.40 | 60.75 |
| Required SOR WAIT ° C. (° F.) | 472.8 (883) | 475 (887) |

In this example the partially loaded case uses approximately 90% to the catalyst quantity compared to the fully loaded case. The simulation consisted of three reactors in series with the entire catalyst decrease being in the third, last-stage reactor. This third, last-stage reactor contained around 80% of the catalyst for the partially loaded case compared to the fully loaded case. The effect of this is increased C5+ yield of 0.24 wt-%, increased total aromatics yield of 0.35 wt-%, increased hydrogen yield of 18 SCFB. This result is achieved with the partially loaded case operating temperature only 2.22° C. (4° F.) greater than the fully loaded case.

Figure 4:
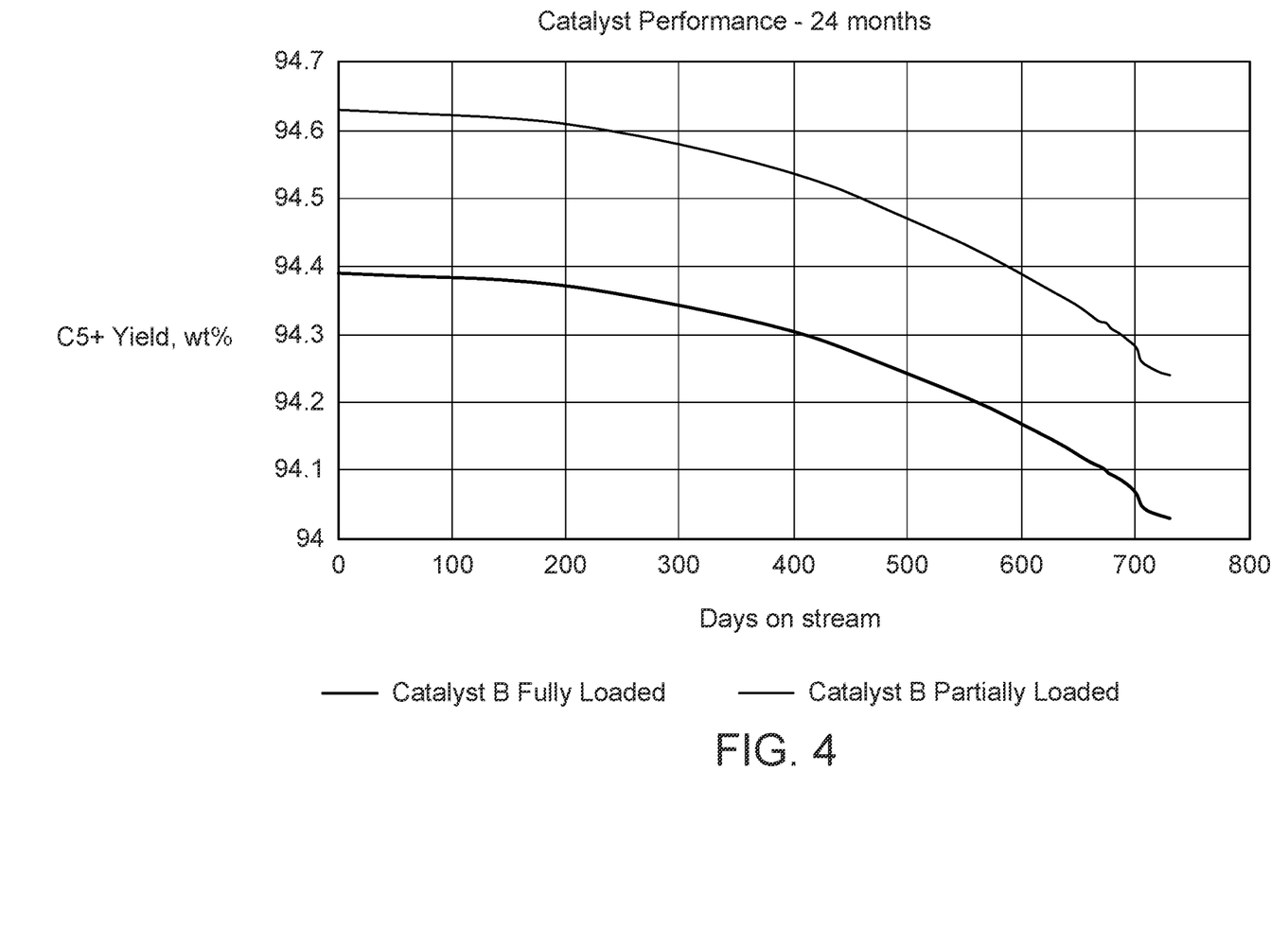

The conditions for Example 2 were simulated to determine the C5+ yield advantage cumulative over a two-year operating period. As shown in FIG. 4, the system partially loaded with Catalyst B is projected to have C5+ yield stability such that it maintains its performance advantage for at least two years of continuous operation under the simulated conditions.

The increased yields for the partially loaded case translate to significantly improved operating economics.

In any embodiment, the present invention provides an effective and efficient way to adjust the catalytic activity in the catalyst zone without physically altering the internals of the reactor. This will allow the reactor to accommodate the same or similar flow rates and processing, which would be not possible when using the conventional approach of physically changing the reactor internals.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for changing overall catalytic activity in a fixed bed, radial flow reforming reactor, the process comprising forming a first annular zone in the radial flow reforming reactor, the first annular zone comprising a first solid particle material having a first catalytic activity for reforming hydrocarbons; and, forming a second annular zone in the radial flow reforming reactor, the second annular zone comprising a second solid particle material having a second catalytic activity for reforming hydrocarbons, the second catalytic activity different than the first catalytic activity, wherein the first and second annular zones define a flow path for a stream of hydrocarbons, and wherein the flow path passes from the first annular zone to the second annular zone. An embodiment of the invention is one, any or all of prior embodiments in this paragraph up through the first embodiment in this paragraph wherein the first solid particle material comprises an inert material. An embodiment of the invention is one, any or all of prior embodiments in this paragraph up through the first embodiment in this paragraph wherein the second solid particle material comprises an inert material. An embodiment of the invention is one, any or all of prior embodiments in this paragraph up through the first embodiment in this paragraph, wherein the first annular zone comprises an inner annular zone. An embodiment of the invention is one, any or all of prior embodiments in this paragraph up through the first embodiment in this paragraph, wherein the second annular zone comprises an inner annular zone. An embodiment of the invention is one, any or all of prior embodiments in this paragraph up through the first embodiment in this paragraph, further comprising providing a divider between the first and second annular zones. An embodiment of the invention is one, any or all of prior embodiments in this paragraph up through the first embodiment in this paragraph, further comprising removing the divider before operating the fixed bed, radial flow reforming reactor. An embodiment of the invention is one, any or all of prior embodiments in this paragraph up through the first embodiment in this paragraph, wherein the divider is positioned between the first and second annular zones while operating the fixed bed, radial flow reforming reactor.

A second embodiment of the invention is a process for loading catalyst into a fixed bed, radial flow reforming reactor, the fixed bed, radial flow reforming reactor comprising an inlet fluid zone, an outlet fluid zone, and an inner catalyst zone between the inlet fluid zone and the outlet fluid zone, the process comprising loading a first solid particle material having a first catalytic activity for reforming hydrocarbons into the inner catalyst zone, the first solid particle material forming a first annular zone when loaded; and, loading a second solid particle material having a second catalytic activity for reforming hydrocarbons into the inner catalyst zone, the second solid particle material forming a second annular zone when loaded, the second catalytic activity different than the first catalytic activity; wherein the first and second annular zones define a flow path for a stream of hydrocarbons through the inner catalyst zone, and wherein the flow path passes from the first annular zone to the second annular zone. An embodiment of the invention is one, any or all of prior embodiments in this paragraph up through the second embodiment in this paragraph, wherein the first solid particle material comprises an inert material. An embodiment of the invention is one, any or all of prior embodiments in this paragraph up through the second embodiment in this paragraph wherein the second solid particle material comprises an inert material. An embodiment of the invention is one, any or all of prior embodiments in this paragraph up through the second embodiment in this paragraph, further comprising providing a divider in the inner catalyst zone so as to provide first and second annular spaces for the first and second solid particle materials, respectively. An embodiment of the invention is one, any or all of prior embodiments in this paragraph up through the second embodiment in this paragraph, further comprising removing the divider before operating the fixed bed, radial flow reforming reactor. An embodiment of the invention is one, any or all of prior embodiments in this paragraph up through the second embodiment in this paragraph, wherein the divider is positioned between the first and second annular zones while operating the fixed bed, radial flow reforming reactor. An embodiment of the invention is one, any or all of prior embodiments in this paragraph up through the second embodiment in this paragraph, wherein the divider is provided in the inner catalyst zone before loading both the first and second solid particle materials.

A third embodiment of the invention is a fixed bed, radial flow reforming reactor comprising an inlet fluid zone; an outlet fluid zone; and, and a catalyst zone between the inlet fluid zone and the outlet fluid zone, wherein the catalyst zone is separated into two concentric, annular zones, a first annular zone comprising a first solid particle material having a first catalytic activity for reforming hydrocarbons into the catalyst zone, the first solid particle material forming a first annular zone when loaded, and, a second annular zone comprising a second solid particle material having a second catalytic activity for reforming hydrocarbons into the catalyst zone, the second catalytic activity different than the first catalytic activity, wherein the first and second annular zones define a flow path for a stream of hydrocarbons through the catalyst zone, and wherein the flow path passes from the first annular zone to the second annular zone. An embodiment of the invention is one, any or all of prior embodiments in this paragraph up through the third embodiment in this paragraph, further comprising a divider in the catalyst zone separating the first and second annular zones. An embodiment of the invention is one, any or all of prior embodiments in this paragraph up through the third embodiment in this paragraph, wherein the first material is inert. An embodiment of the invention is one, any or all of prior embodiments in this paragraph up through the third embodiment in this paragraph wherein the second solid particle material comprises an inert material. An embodiment of the invention is one, any or all of prior embodiments in this paragraph up through the third embodiment in this paragraph, wherein the first annular zone is an outer annular zone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for changing overall catalytic activity in a fixed bed, radial flow reforming reactor, the process comprising:
    forming a first annular zone in the radial flow reforming reactor, the first annular zone comprising a first solid particle material having a first catalytic activity for reforming hydrocarbons;
    forming a second annular zone in the radial flow reforming reactor, the second annular zone comprising a second solid particle material having a second catalytic activity for reforming hydrocarbons, the second catalytic activity different than the first catalytic activity; and, providing a divider between the first and second annular zones;

wherein the first and second annular zones define a flow path for a stream of hydrocarbons, and wherein the flow path passes from the first annular zone to the second annular zone, and wherein the divider is removed before operating the fixed bed, radial flow reforming reactor.

2. The process of claim 1, wherein the first solid particle material comprises an inert material.

3. The process of claim 1, wherein the second solid particle material comprises an inert material.

4. The process of claim 3, wherein the first annular zone comprises an inner annular zone.

5. The process of claim 3, wherein the second annular zone comprises an inner annular zone.

6. The process of claim 1, wherein the divider is positioned between the first and second annular zones while operating the fixed bed, radial flow reforming reactor.

7. A process for loading catalyst into a fixed bed, radial flow reforming reactor, the fixed bed, radial flow reforming reactor comprising an inlet fluid zone, an outlet fluid zone, and an inner catalyst zone between the inlet fluid zone and the outlet fluid zone, the process comprising:

loading a first solid particle material having a first catalytic activity for reforming hydrocarbons into the inner catalyst zone, the first solid particle material forming a first annular zone when loaded;

loading a second solid particle material having a second catalytic activity for reforming hydrocarbons into the inner catalyst zone, the second solid particle material forming a second annular zone when loaded, the second catalytic activity different than the first catalytic activity; and, providing a divider in the inner catalyst zone so as to provide first and second annular spaces for the first and second solid particle materials, respectively, wherein the first and second annular zones define a flow path for a stream of hydrocarbons through the inner catalyst zone, and wherein the flow path passes from the first annular zone to the second annular zone, and wherein the divider is removed before operating the fixed bed, radial flow reforming reactor.

8. The process of claim 7, wherein the first solid particle material comprises an inert material.

9. The process of claim 7, wherein the second solid particle material comprises an inert material.

10. The process of claim 7, wherein the divider is positioned between the first and second annular zones while operating the fixed bed, radial flow reforming reactor.

11. The process of claim 7, wherein the divider is provided in the inner catalyst zone before loading both the first and second solid particle materials.

\* \* \* \* \*